Figure 1:
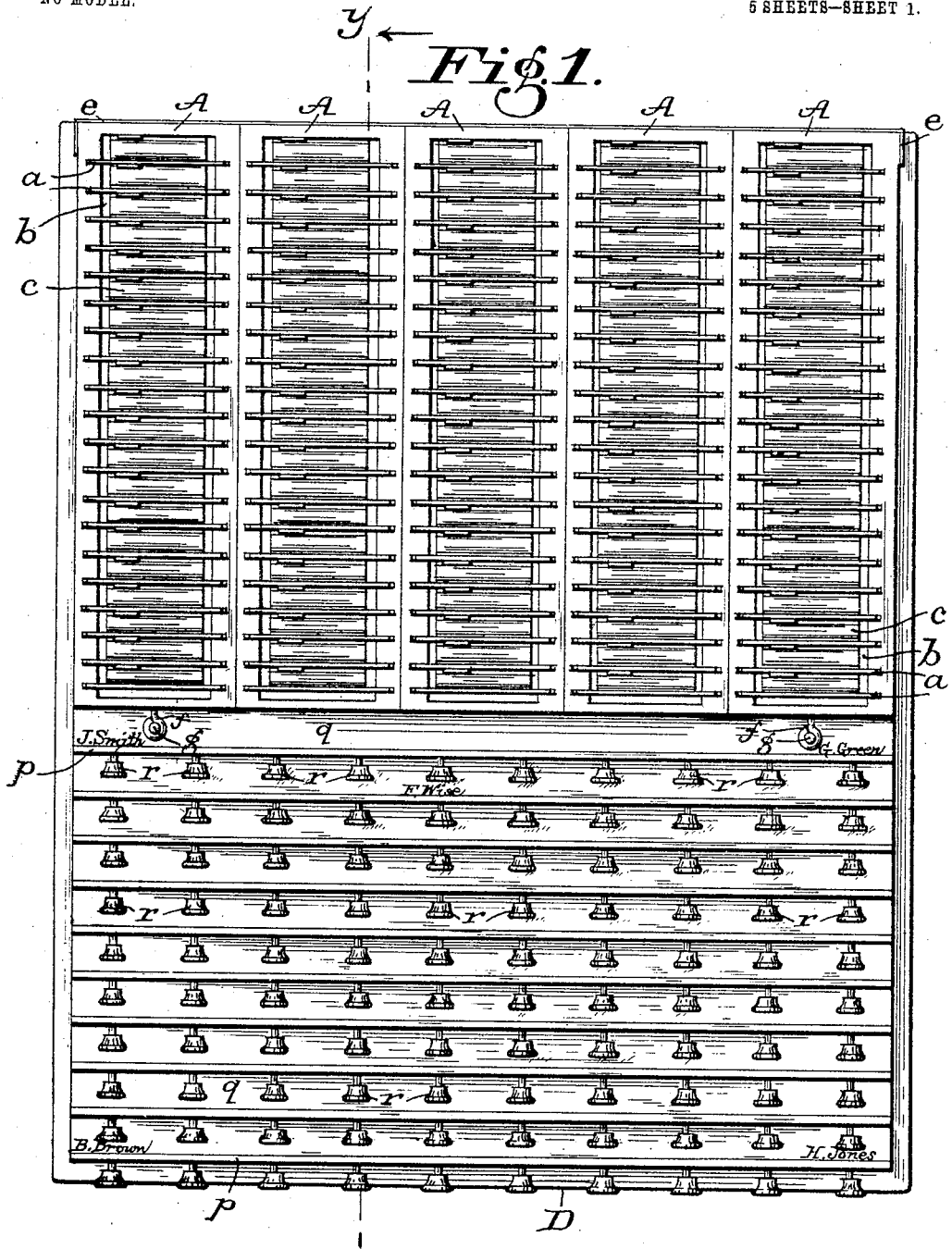

No. 777,720. PATENTED DEC. 20, 1904.
B. FIALA & C. GOELZ.
FILE CASE FOR ACCOUNT BOOKS.
APPLICATION FILED SEPT. 21, 1903.
NO MODEL. 5 SHEETS—SHEET 2.

WITNESSES: Bennie Fiala, Robt. S. McMaster.

INVENTORS: Bert Fiala and Chas. Goelz, By Frank M. Burnham, Attorney.

No. 777,720. PATENTED DEC. 20, 1904.
B. FIALA & C. GOELZ.
FILE CASE FOR ACCOUNT BOOKS.
APPLICATION FILED SEPT. 21, 1903.
NO MODEL. 5 SHEETS—SHEET 3.
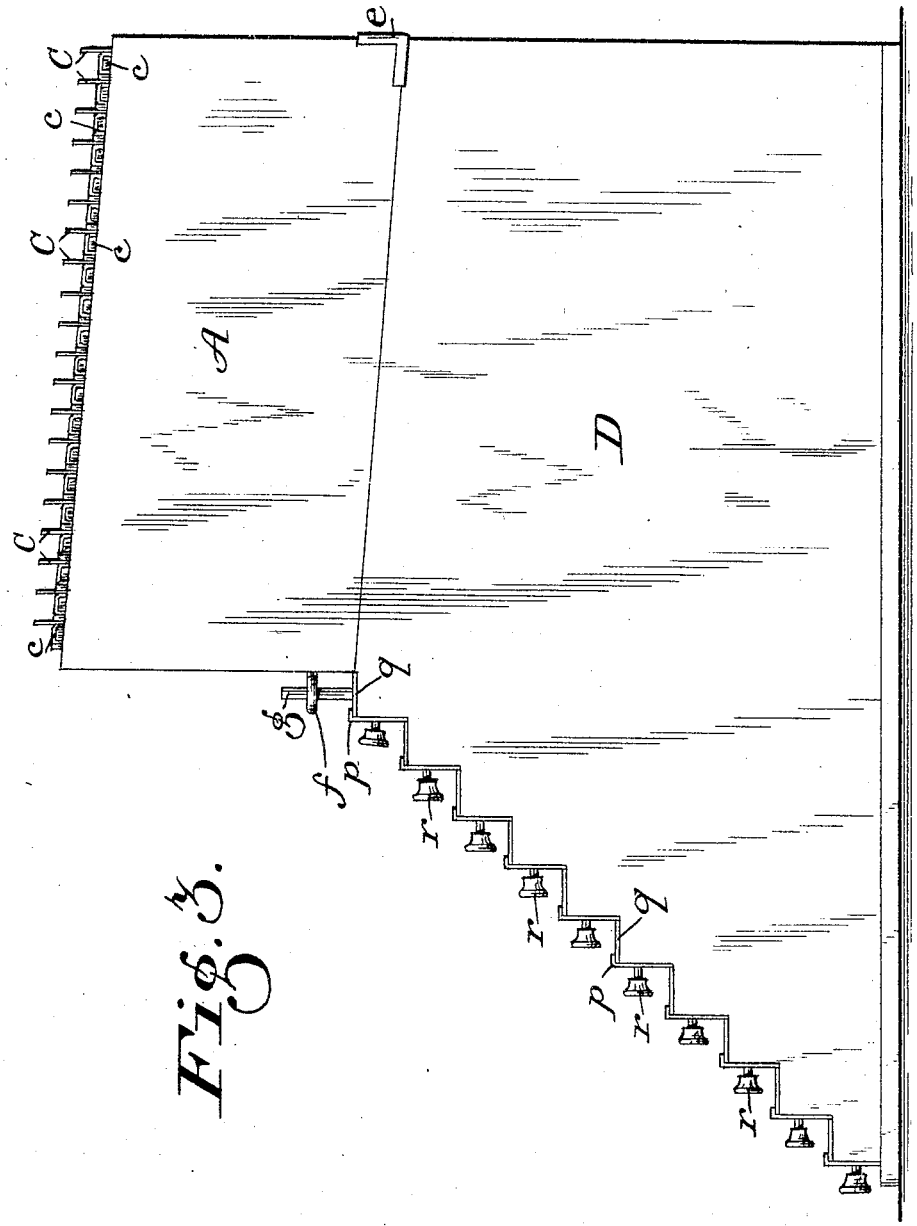

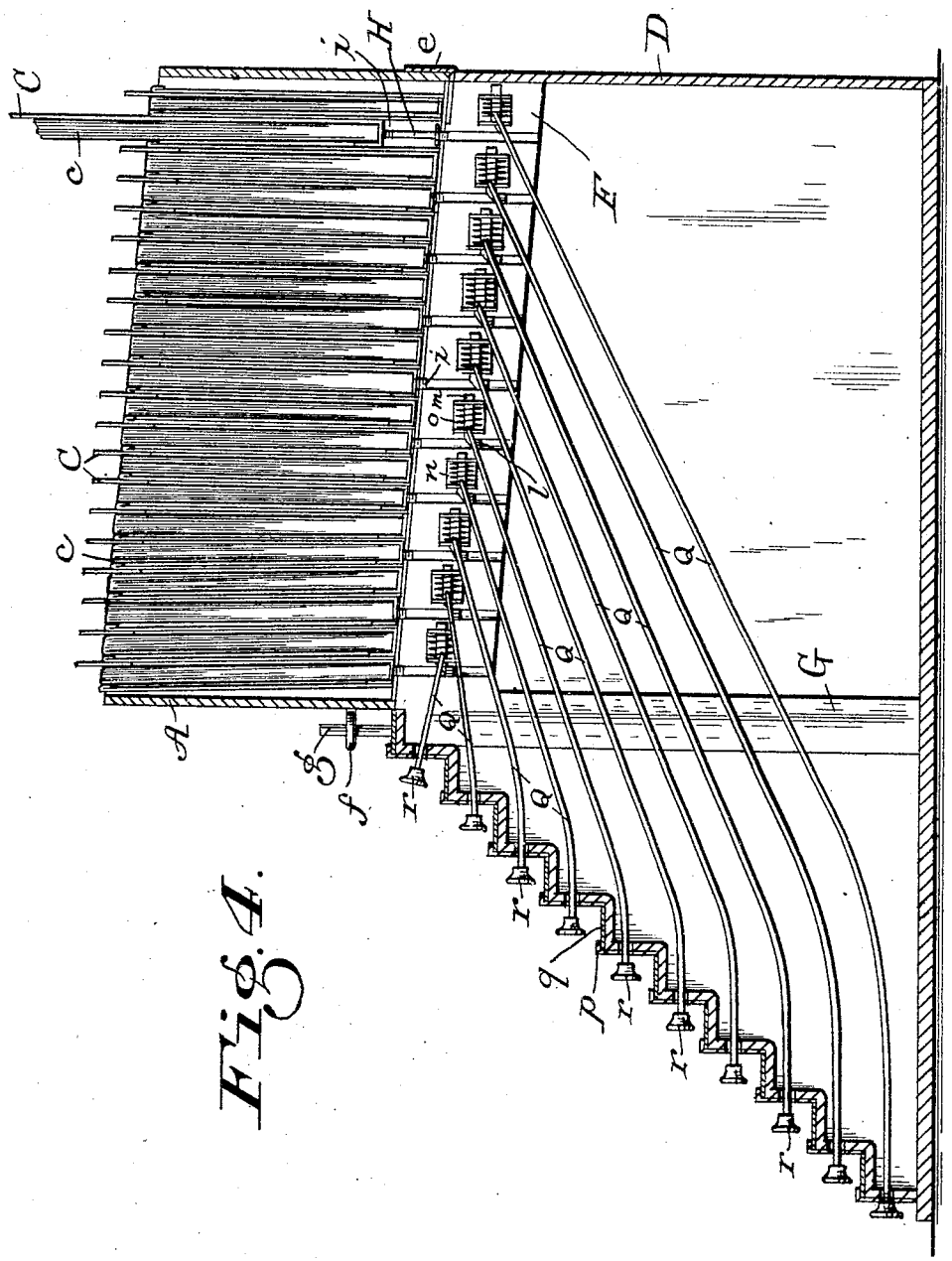

No. 777,720. PATENTED DEC. 20, 1904.
B. FIALA & C. GOELZ.
FILE CASE FOR ACCOUNT BOOKS.
APPLICATION FILED SEPT. 21, 1903.
NO MODEL. 5 SHEETS—SHEET 5.
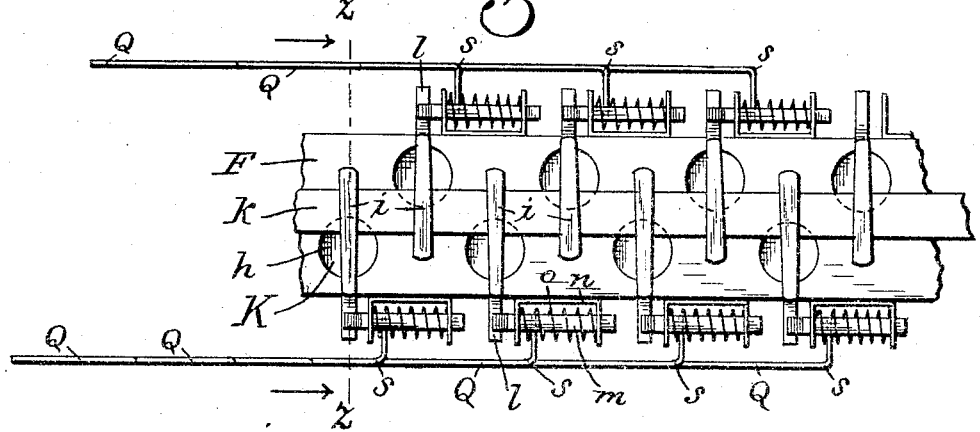
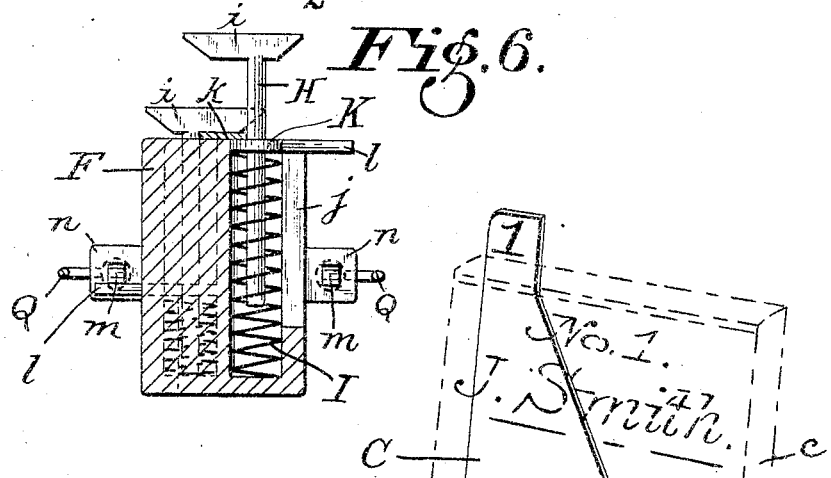
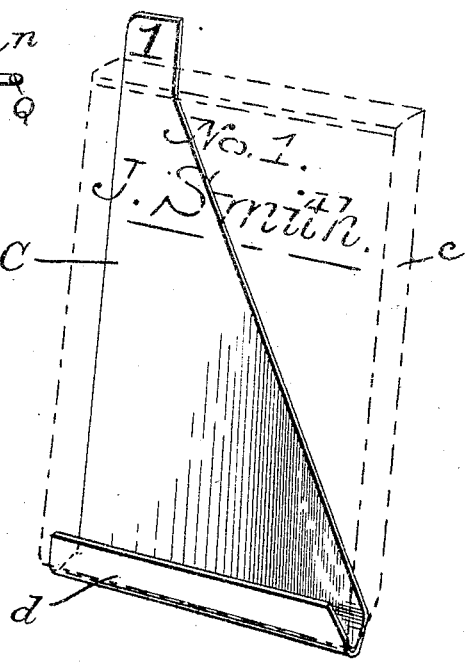
WITNESSES:
Bennie Fiala
Robt. S. McMaster.
INVENTORS:
Bert Fiala and Chas. Goelz,
BY
Frank M. Burnham
Attorney.

No. 777,720.

Patented December 20, 1904.

UNITED STATES PATENT OFFICE.

BERT FIALA AND CHARLES GOELZ, OF DAYTON, OHIO.

FILE-CASE FOR ACCOUNT-BOOKS.

SPECIFICATION forming part of Letters Patent No. 777,720, dated December 20, 1904.

Application filed September 21, 1903. Serial No. 174,019.

*To all whom it may concern:*

Be it known that we, BERT FIALA and CHARLES GOELZ, citizens of the United States, residing at Dayton, in the county of Montgomery and State of Ohio, have invented certain new and useful Improvements in File-Cases for Account-Books; and we do hereby declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to a file-case for credit account-books or for that class of books used in most business houses, and especially grocery stores, for keeping the account of a customer and commonly known as "pass-books."

The objects or purposes of this our invention consist in producing a device that will facilitate the labor of locating and handling the account-book of a customer by furnishing a ready means for always keeping an account-record of all "credit account-books" in said business house, so that the location or whereabouts of all of said books may be quickly ascertained by the clerks or salesmen or by the drivers of the delivery-wagon at once, thus avoiding the great amount of labor and time heretofore consumed when the books are simply stored or deposited in a drawer or on a shelf or in any ordinary receptacle having numerous small unclassified compartments promiscuously placed; but our device has the name and number of each book duplicated for the proper compartment on said device.

Referring in general terms to the construction of our file-case for credit account-books, this invention consists of the receptacles for the books, which may consist of a number of receptacles or sections or one large bin partitioned or divided into the desired and requisite number of receptacles, the base or lower inclosing case, the plunger and book-actuating mechanism and minor details of construction, and the peculiar and novel arrangement and combination of these various parts, as will be more fully described hereinafter and pointed out in the subjoined claims, in accordance with the statutes in such cases made and provided therefor.

Figure 2:
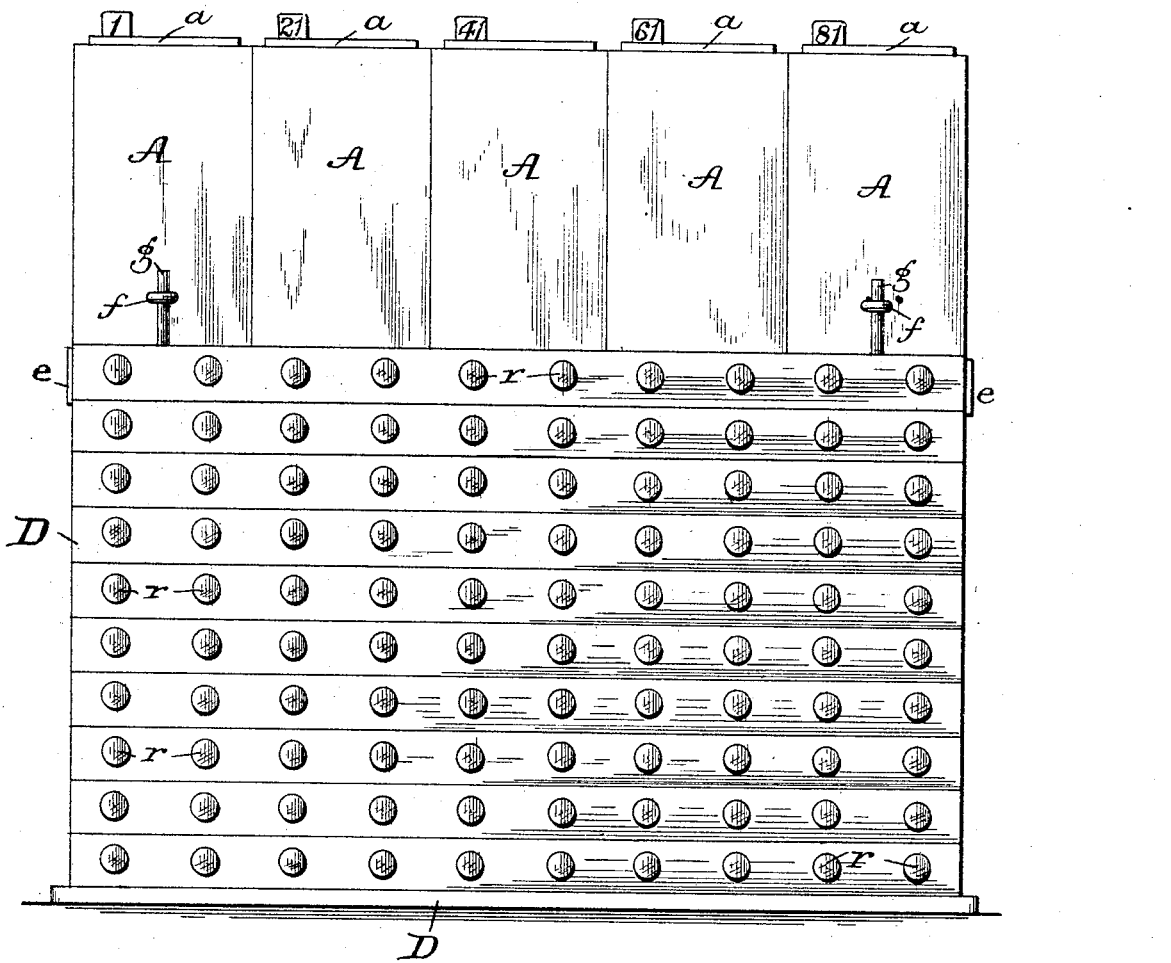

Referring to the annexed drawings, constituting a formal part of this specification, and wherein the same letters of reference point out the identical parts wherever occurring throughout the several views, Figure 1 is a plan view of the device. Fig. 2 is a front elevation of the same. Fig. 3 is a side elevation. Fig. 4 is a vertical longitudinal sectional view on line *y y* of Fig. 1. Fig. 5 is a plan view in detail of a broken-away portion of one of the central beams which carries the book-raising mechanism. Fig. 6 is a transverse sectional view taken on line *z z* of Fig. 5, but on a slightly-enlarged scale, and showing one of the book-raising plungers in an elevated position. Fig. 7 is a detail view in perspective of one of the book-rests with a credit account-book shown in position in dotted lines.

In describing our said invention, and referring in detail to the different parts or features of construction as shown throughout the various views of the accompanying drawings and indicated by means of the letters of reference, as aforesaid, A refers to the receptacles, provided with partition-walls *a*, thus forming compartments *b*, each adapted to receive the credit account (or pass) book *c*, said books each resting in a support or shield C, suitably formed, as at *d*, preferably constructed out of thin sheet metal, carrying at its top an index-number which corresponds with the number on the book, as is more clearly and fully shown in Figs. 2 and 7, said index projecting sufficiently high in the clear of all obstructions and above the book-receptacles or any part of the file-case, so that when it is desired to return to the proper compartment any account-book after being used in entering the customer's purchase all that is necessary is to locate the index-number projecting above the compartment which corresponds and is identical with the number on the book. For example, as shown in Fig. 7, the book here shown has "No. 1" marked or printed upon it, and the support or shield in which it rests when in the proper compartment carries the index-number "1," and as the supports are intended to rest normally in the compartments to which they belong when the books are out it is thus seen that the book can be readily and quickly returned to the proper compartment from which it has been taken.

Receptacles A are detachably held in position and rest solidly upon the inclosing base D by means of a small flange e, extending upward from the base around the rear and at the corners; also, an eye f, projecting from the two outer receptacles, adapted to rest over a pin g, projecting upwardly from said base, (see Figs. 1, 2, 3, and 4,) and also by means of beams or braces F, which extend centrally and longitudinaly under each of the five receptacles. (See Fig. 4.) Below and underneath the center of each of the five rows of books, as shown in Fig. 4, and extending longitudinally with each of the said receptacles is the said beam or brace F, which is supported by an upright or standard G. Each of said beams is formed with a row of bores h, which alternate one with the other on each side, as shown in Fig. 5, thus permitting the top or cross piece i of one of a number of vertical plungers H to rest directly under portion d of book-shield C, in which rests the book, and in the style and size of case here illustrated we have shown twenty books in a row in each receptacle. Therefore there will necessarily be twenty of said plungers, which for the purpose of leaving sufficient space between, so said plungers and the mechanism actuating each one will not conflict or interfere one with the other, we have arranged the plungers to alternate, so that ten pieces of mechanism suitable to actuate ten vertical plungers will come on a side of beam F, as shown in Figs. 4 and 5.

A slot j extends outwardly from each bore h partially the depth of said bores, and when the book-support C is pushed or forced down in compartment b said vertical plunger, by means of the top or cross piece i, will be forced down in said bores, and an annular portion K, which is held in position at its top by strip k, compresses spring I until arm l of said plunger will have moved or traveled down slot j (see dotted lines in Fig. 6) and come in contact or engagement with short arm or horizontal plunger m, which rests and moves in bearings n, and as spring o is compressed sufficient to permit arm l to rest in a locked position underneath the beveled end of said horizontal plunger and as said horizontal plunger is thrown back in its normal position through the reaction or expansion of spring o support C and book c will rest in the compartment in a normal position, so the top will come on a level with the remainder of the books in said receptacle, as shown.

Base D is formed at the front similar to steps and provided with a flange p, which receives a strip of glass or mica q or other similar suitable transparent material, upon which is painted the name of each customer, the same as on each book, or, if so desired, said names may be printed upon strips of paper and placed beneath said glass, (see Figs. 1, 3, and 4,) said flange permitting of a new glass strip being used when necessary, and by the operator simply pushing or forcing in with his thumb the thumb-knob r, located just underneath the name on the glass of the customer whose book is desired, the push-rod Q, which is bent at s, so as to connect with horizontal plunger m, and as said push-rod also acts as a bearing for spring o (see Fig. 5) said horizontal plunger will be forced backward at the same time said spring will be compressed, and as arm l is thus released vertical plunger H, by reason of the reaction and expansion of spring I, will throw up the desired book, as shown in Fig. 4.

In Fig. 1, so as not to complicate the drawings, we have shown only a few names of the customers similar to those on the books; but it will of course be understood that in practice a name is to come just above each thumb-knob, and as there is a push-rod for each book and indexed support there will necessarily be just as many thumb-knobs. In the illustration we have here shown a file-case large enough to receive one hundred indexed supports and one hundred books, thus necessitating one hundred compartments and one hundred thumb-knobs at the front; but it is obvious that our file-case may be built of any dimensions and have as many book-compartments as desired; also, that the partitions in said compartments may be made stationary as well as removable, if so desired; also, as hereinbefore referred to, instead of several book-receptacles one large bin divided into sections to hold the books may be employed.

In Fig. 2 can be seen the first index-number at top of each of the row of book-supports in each of the receptacles, which are "1," "21," "41," "61," and "81," the twenty index-numbers in each row coming in a line, while the corresponding thumb-knobs for operating said supports come in a double row on account of the arrangement of the mechanism connected to the beam, as heretofore fully described.

We wish to be here fully and clearly understood, according to the well-known and long-established doctrine of patent law, as reserving the right to make any and all minor and necessary changes and variations as may from time to time be suggested, all within the scope and principles of the invention.

Having now described our file-case for credit account-books, what we claim as our invention we have set forth in the following combinations:

In a file-case for account-books, a series of compartments, book-supports vertically movable in said compartments, spring-actuated plungers for raising said supports, each plunger having a laterally-extending arm, horizontal spring-actuated locking devices normally in engagement with the plunger-arms, and push-rods connected with said devices for releasing the plunger-arms.

In testimony whereof we have affixed our signatures in presence of two witnesses.

BERT FIALA.
CHARLES GOELZ.

Witnesses:
CHAS. S. OWENS,
JAMES O. HARTSHORN.